(12) United States Patent
Merlin

(10) Patent No.: US 12,180,858 B2
(45) Date of Patent: Dec. 31, 2024

(54) GUIDE VANE ASSEMBLY FOR AN AIRCRAFT TURBINE ENGINE

(71) Applicant: SAFRAN AIRCRAFT ENGINES, Paris (FR)

(72) Inventor: Remi Merlin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/255,351

(22) PCT Filed: Nov. 26, 2021

(86) PCT No.: PCT/FR2021/052110
§ 371 (c)(1),
(2) Date: May 31, 2023

(87) PCT Pub. No.: WO2022/123140
PCT Pub. Date: Jun. 16, 2022

(65) Prior Publication Data
US 2024/0035389 A1 Feb. 1, 2024

(30) Foreign Application Priority Data
Dec. 7, 2020 (FR) ...................................... 2012748

(51) Int. Cl.
*F01D 9/04* (2006.01)
(52) U.S. Cl.
CPC ........ *F01D 9/041* (2013.01); *F05D 2220/323* (2013.01); *F05D 2240/10* (2013.01); *F05D 2240/80* (2013.01); *F05D 2250/184* (2013.01); *F05D 2300/611* (2013.01)

(58) Field of Classification Search
CPC .............. F01D 9/041; F05D 2220/323; F05D 2240/10; F05D 2240/80; F05D 2250/184; F05D 2300/611
See application file for complete search history.

(56) References Cited

U.S. PATENT DOCUMENTS

2013/0259673 A1* 10/2013 Waki ....................... F01D 25/00
415/208.1
2019/0284946 A1* 9/2019 Berdowski .............. F01D 11/20

FOREIGN PATENT DOCUMENTS

| EP | 3540180 A1 | 9/2019 |
| FR | 3001761 A1 | 8/2014 |
| FR | 3055145 A1 | 2/2018 |
| FR | 3082233 A1 | 12/2019 |

OTHER PUBLICATIONS

International Search Report received for PCT Patent Application No. PCT/FR2021/052110, mailed on Mar. 15, 2022, 5 pages (2 pages of English Translation and 3 pages of Original Document).

* cited by examiner

*Primary Examiner* — Courtney D Heinle
*Assistant Examiner* — Andrew J Marien
(74) *Attorney, Agent, or Firm* — WOMBLE BOND DICKINSON (US) LLP

(57) ABSTRACT

A guide vane assembly of an aircraft turbine engine, the guide vane assembly being segmented into a plurality of segments arranged circumferentially next to one another about an axis. The guide vane assembly includes two annular rings connected together by vanes and the geometry of the inner ring is modified to reduce the vibrational responses of the guide vane assembly.

10 Claims, 4 Drawing Sheets

[Fig. 1]
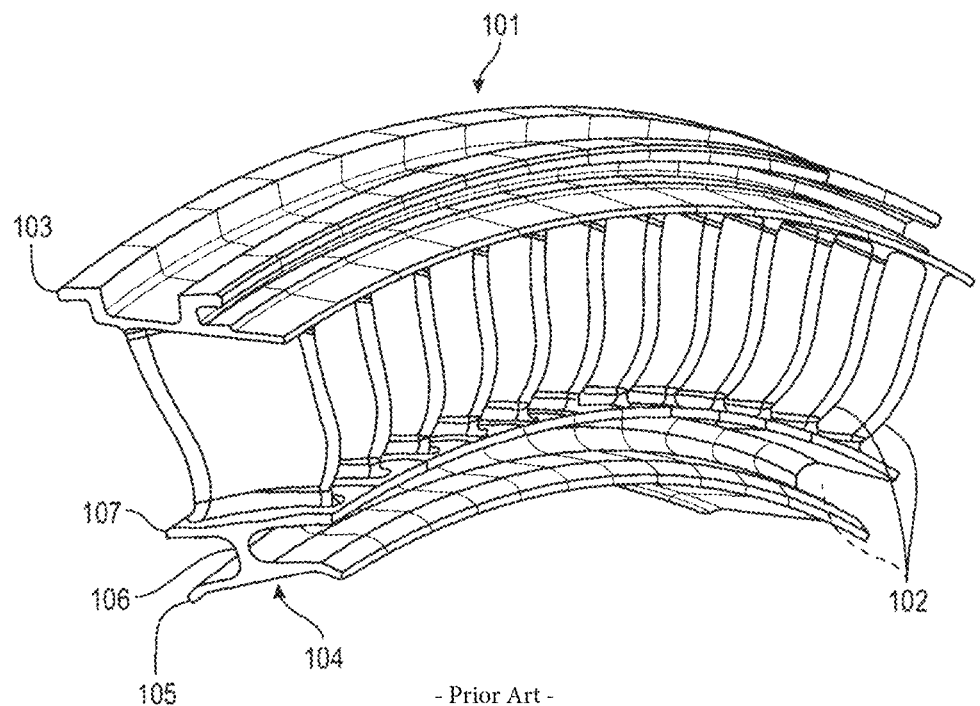
- Prior Art -
[Fig. 2]
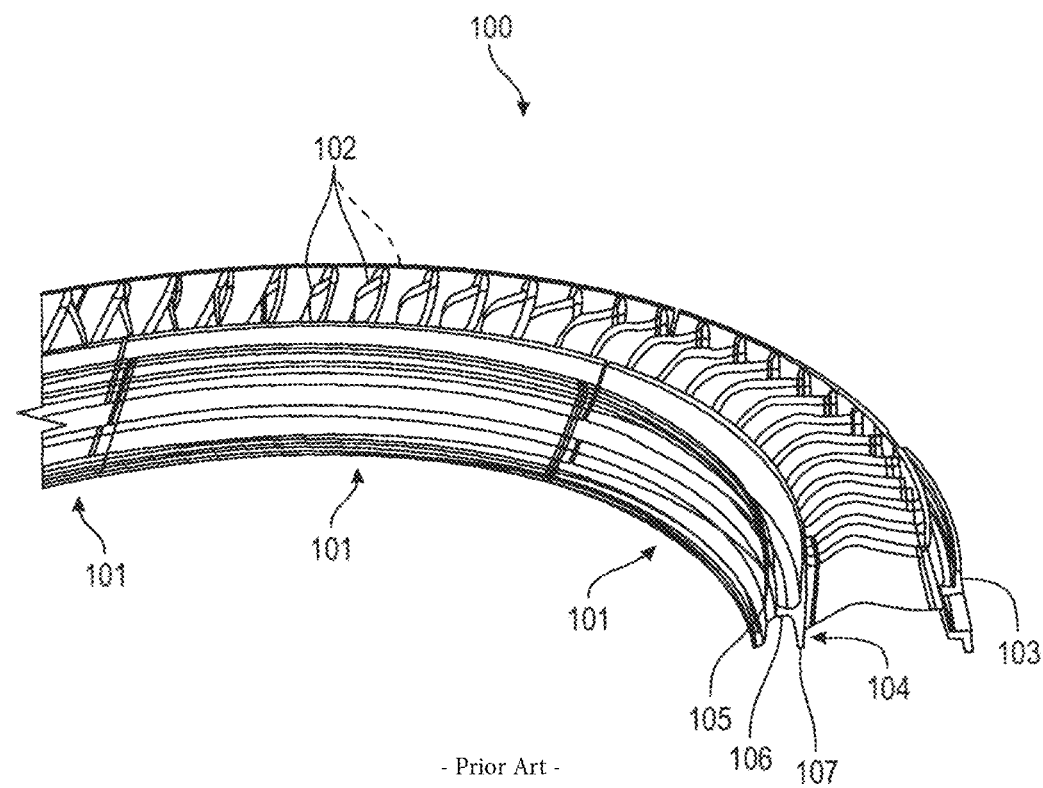
- Prior Art -

[Fig. 3a]
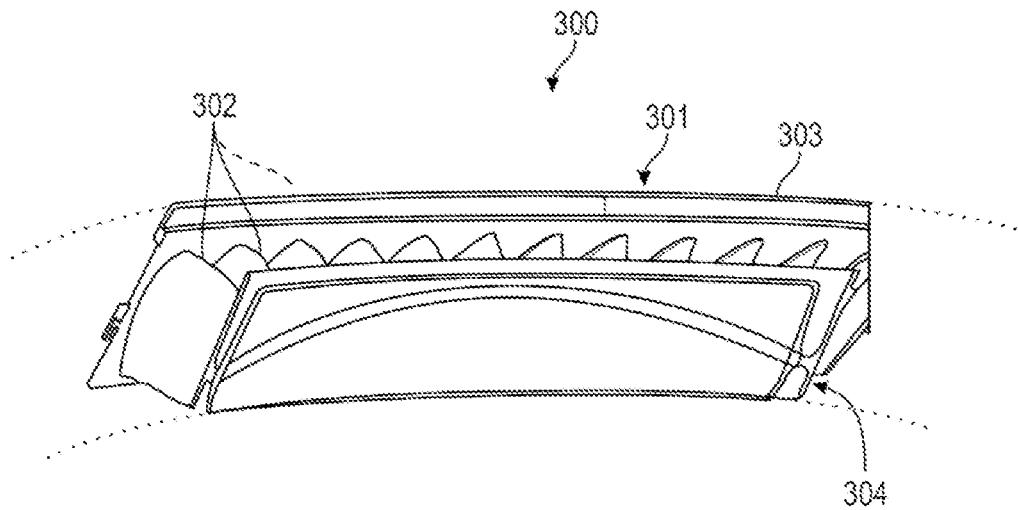
[Fig. 3b]
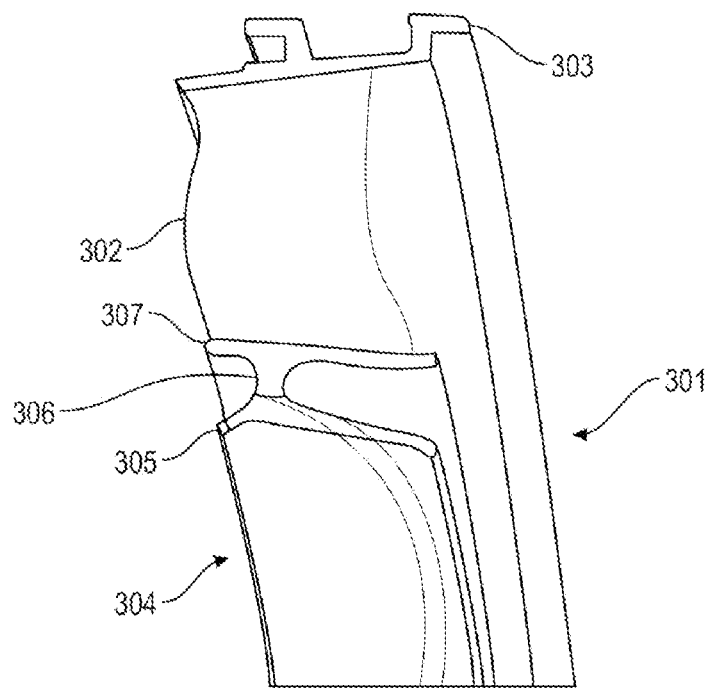

[Fig. 4a]
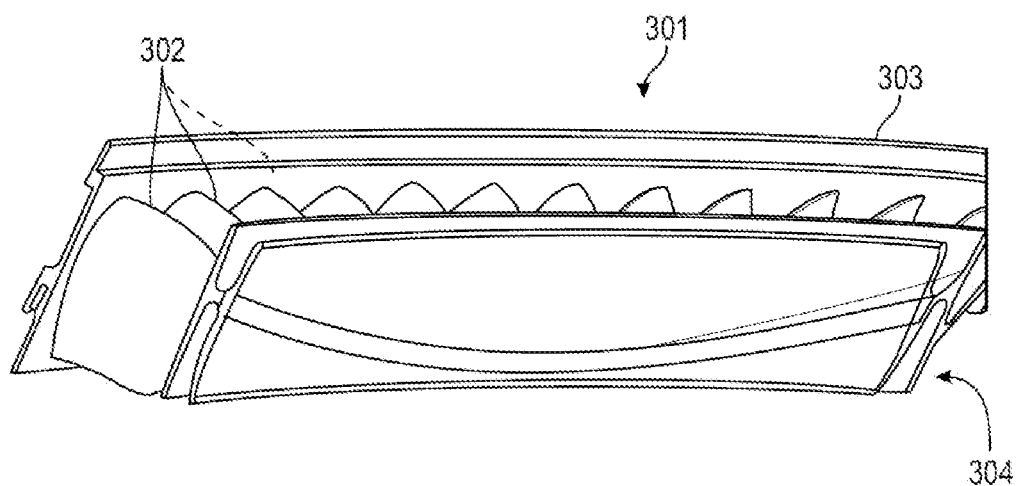
[Fig. 4b]
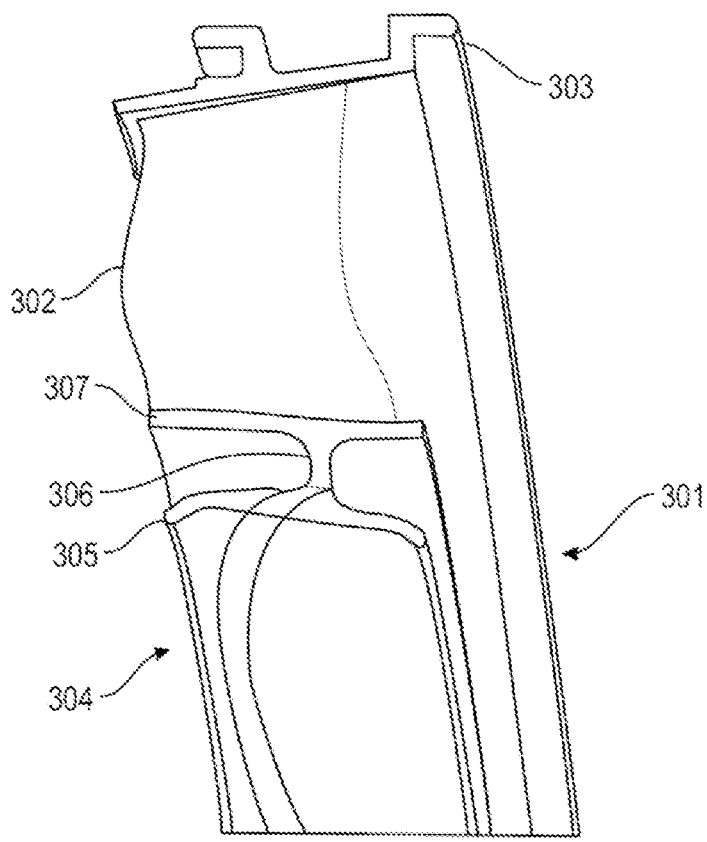

[Fig. 5a]
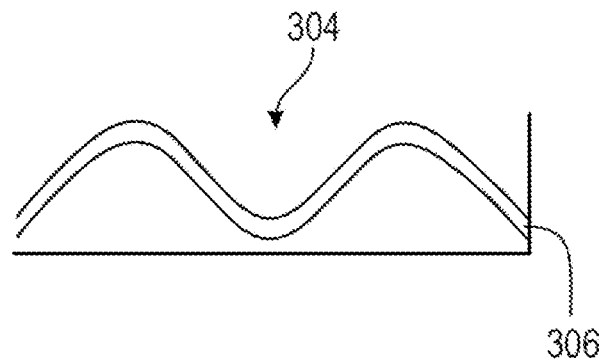
[Fig. 5b]
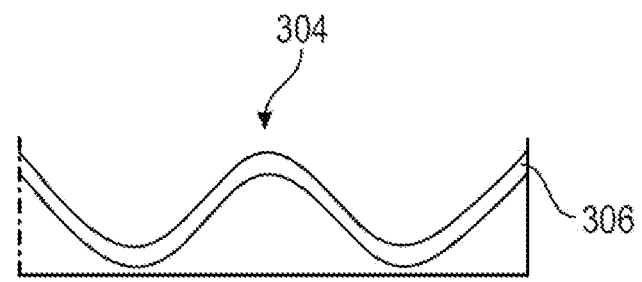
[Fig. 6a]
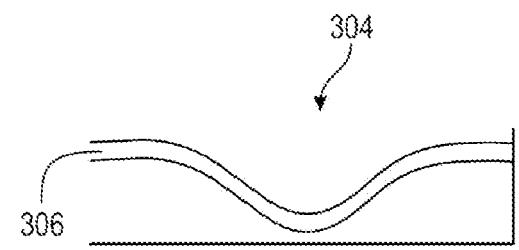
[Fig. 6b]
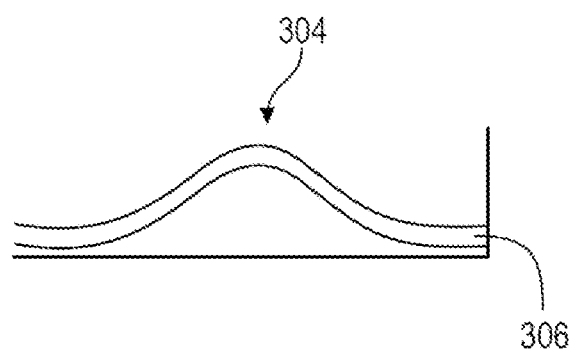

GUIDE VANE ASSEMBLY FOR AN AIRCRAFT TURBINE ENGINE

TECHNICAL FIELD OF THE INVENTION

The invention relates to the field of the aircraft turbine engine guide vane assemblies.

TECHNICAL BACKGROUND

The prior art comprises in particular the documents FR-A1-3 082 233, FR-A1-3 055 145, FR-A1-3 001 761 and EP-A1-3 540 180.

In the aircraft turbine engines, and in particular in the twin-body turbojet engines, each stage of a compressor classically comprises, on the one hand, a rotor portion with movable blades whose rotation about an axis of the turbine engine leads to the acceleration of a flow in a duct of the compressor and, on the other hand, a stator portion, adjoined to the rotor portion, whose role is to rectify the flow coming from the blades of the rotor. This stator portion, also known as a guide vane assembly, is made up of a plurality of sectors which together form a complete annular-shaped guide vane assembly. In other words, a guide vane assembly is sectorised and comprises a plurality of sectors arranged circumferentially next to each other and extending around a common axis.

FIGS. 1 and 2 illustrate respectively an example of a guide vane assembly sector and several assembled sectors of a guide vane assembly according to the prior art. In particular, only one sector 101 is shown in FIG. 1 and three sectors 101 are shown in FIG. 2.

The guide vane assembly 100, partly shown in FIG. 2, comprises two annular shells 104 and 103, internal and external respectively, which extend around a common axis X and are connected together by blades 102. Furthermore, as is more clearly shown in FIG. 1, all the blades 102 of the sector 101 are identical and all the sector stretches to which these blades are connected are also identical.

The repetition of identical stretches along the entire length of the sector 101 makes it susceptible to vibration-related resonance phenomena. More precisely, as all the stretches are identical, they respond to the same frequencies and as their connections are carried out via very rigid shells, there is an accumulation of vibratory phenomena and therefore an amplification of the response to the vibrations of the guide vane assembly as a whole.

In addition, the more rigid the shells that connect the blades, the better the energy (of the vibrations) is transmitted from blade to blade.

In the present case, the internal shell 104 is I-shaped in axial cross-section. More specifically, it comprises an internal cylindrical wall 105 and an external cylindrical wall 107 which are connected to each other by an annular core 106. The experience shows that such a geometry leads to very high vibrational levels and a very dense modal base. In particular, the fact that this geometry has a very dense modal base favours the accumulation of modes and consequently leads to high vibrational levels (i.e. an amplitude of the vibrations).

In summary, the problem of the response to the vibrations of guide vane assemblies in an aircraft turbine engine is a major issue. In particular, since such a guide vane assembly is intended to be integrated into a high-pressure compressor of a high-pressure body, it must be able to withstand harsh environmental conditions (i.e. in terms of pressure, temperature and high speed of the rotor) that generate a high number of modes and high vibration levels.

SUMMARY OF THE INVENTION

The present invention proposes a solution allowing for reducing the vibration response of a guide vane assembly. Furthermore, the proposed solution does not affect the design of a sector related to its aerodynamic properties (i.e. the shape of the blades) or to its integration in the guide vane assembly (i.e. the interfaces between sectors).

To this end, according to a first aspect, the invention relates to a guide vane assembly for an aircraft turbine engine, this guide vane assembly comprising two annular shells, an internal and an external respectively, extending around a common axis and connected together by blades, said internal shell being substantially I-shaped in axial cross-section and comprising two cylindrical walls, respectively internal and external, and connected to each other by an annular core, the guide vane assembly being sectorised and comprising a plurality of sectors arranged circumferentially next to each other about said axis, characterised in that each of the sectors comprises a core segment which comprises at least one concavity oriented in the axial direction.

By modifying the geometry of the internal shell of the guide vane assembly, the response of it to the vibrations is modified. In particular, the axial displacement of the core of the internal shell on certain segments of the shell results in a change in the stiffness of said shell which allows to reduce its vibrational responses.

The guide vane assembly according to the invention may comprise one or more of the following characteristics, taken alone or in combination with each other:
- each of the sectors comprises a core segment which comprises at least one concavity oriented towards upstream with respect to a flowing direction of the gases through the guide vane assembly in operation.
- each of the sectors comprises a core segment which comprises at least one concavity oriented towards downstream with respect to a flowing direction of the gases through the guide vane assembly in operation.
- each of the sectors comprises a core segment which comprises at least two concavities oriented axially in a same direction.
- the guide vane assembly sectors are identical.
- the core extends in an axial direction over a dimension that is at least 200% of an axial thickness of the core.
- the core has a general sinusoidal shape about said axis.
- the core segment of each sector comprises circumferential ends which extend in a plane perpendicular to the axis, or which extend in planes inclined with respect to this axis.
- the internal cylindrical wall carries an annular coating of abradable material.

According to a second aspect, the invention also relates to an aircraft turbine engine, comprising at least one guide vane assembly according to the first aspect.

BRIEF DESCRIPTION OF THE FIGURES

The invention will be better understood and other details, characteristics and advantages of the present invention will become clearer from the following description made by way of non-limiting example and with reference to the attached drawings, in which:

FIG. 1 is a perspective view of a guide vane assembly sector according to the prior art;

FIG. 2 is a perspective view of a guide vane assembly according to the prior art;

FIG. 3a is a perspective view of a guide vane assembly sector according to a first embodiment of the invention;

FIG. 3b is a perspective view of a guide vane assembly sector according to a first embodiment of the invention;

FIG. 4a is a perspective view of a guide vane assembly sector according to a second embodiment of the invention;

FIG. 4b is a perspective view of a guide vane assembly sector according to a second embodiment of the invention;

FIG. 5a is a schematic representation of the shape of an internal shell of a guide vane assembly sector according to a third embodiment of the invention;

FIG. 5b is a schematic representation of the shape of an internal shell of a guide vane assembly sector according to a fourth embodiment of the invention;

FIG. 6a is a schematic representation of the shape of an internal shell of a guide vane assembly sector according to a fifth embodiment of the invention; and, FIG. 6b is a schematic representation of the shape of an internal shell of a guide vane assembly sector according to a sixth embodiment of the invention.

The elements having the same functions in the different embodiments have the same references in the figures.

DETAILED DESCRIPTION OF THE INVENTION

FIGS. 1 and 2 have been described above.

With reference to FIG. 3a and to FIG. 3b we will now describe a guide vane assembly 300 of an aircraft turbine engine (not shown) according to a first embodiment. For reasons of readability, only the sector 301 of the guide vane assembly 300 is shown, while the other sectors are symbolised by the dotted lines in FIG. 3a. The guide vane assembly 300 thus comprises a plurality of sectors 301 which are arranged circumferentially next to each other around an axis X. The complete guide vane assembly 300 has thus a shape of annulus.

FIGS. 3a and 3b are two perspective views of a guide vane assembly sector 301 from two distinct points of view, respectively from below (i.e. from the internal portion of the sector) and from the wafer (i.e. from one of the longitudinal ends of the sector). In both cases, the most internal portion 305 of the sector 301, is shown in transparency to make the specific shape of a portion of the sector described below more apparent.

The guide vane assembly 300 comprises two annular shells 304 and 303, internal and external respectively, which extend around a common axis X and are connected together by blades 302. As can be seen more clearly in FIG. 3b, the internal shell is substantially I-shaped in axial cross-section. In particular, it comprises two cylindrical walls 305 and 307, internal and external respectively, which are connected to each other by an annular core 306. The person skilled in the art will appreciate that the invention also applies to a shell whose internal cylindrical wall carries an annular coating of abradable material.

In addition, the internal shell 304 comprises a core segment that comprises an axially oriented concavity. In the example shown in FIGS. 3a and 3b, the core 306 of the sector 301 is substantially U-shaped. Thus, in this example, the concavity of the core is oriented towards upstream with respect to a flowing direction of the gases through the guide vane assembly in operation. In other words, the ends of the U are oriented towards upstream when the guide vane assembly is mounted in the turbine engine.

FIGS. 4a and 4b illustrate a further embodiment in which the core 306 of the sector 301 is substantially an inverted U-shaped, i.e. the concavity of the core is oriented towards downstream with respect to a flowing direction of the gases through the guide vane assembly in operation.

In the various embodiments of the invention, the different sectors of the guide vane assembly may be all the same or different from each other. Furthermore, in one particular embodiment, the ends of the facing sectors in the guide vane assembly are identical. Advantageously, the fact that at least the ends of the sectors of a guide vane assembly are identical allows to avoid the occurrence of flux recirculation phenomena, i.e. the fact that a flux can circulate at the level of the internal shell at each junction between two distinct sectors.

FIGS. 5a and 5b illustrate two embodiments of the guide vane assembly in which each of the sectors comprises a core segment that comprises at least two concavities oriented axially in a same direction. For example, the core 502 is substantially in the shape of two identical U's adjoining each other, as in FIG. 5b, or the core 501 is substantially in the shape of two identical inverted U's adjoining each other, as in FIG. 5a.

In other embodiments, the core of the internal shell may have a general sinusoidal shape. In yet other embodiments, as shown in FIGS. 6a and 6b, the core 601 or 602 is substantially U-shaped with the ends extended by core segments extending parallel to the longitudinal extent of the internal shell.

Advantageously, the variation of the axial position of the core along the longitudinal extent of a guide vane assembly sector results in a local variation in the stiffness of the internal shell and, consequently, a variation in the vibratory responses of the guide vane assembly. In this case, the stiffness of the internal shell is locally reduced and this leads to a reduction in the vibratory responses of the sector.

The person skilled in the art will know how to adapt the shape of the core to obtain these effects in a given guide vane assembly. In particular, the shape of the core can be modified to reduce the vibrational responses to certain ranges of vibration frequencies.

Furthermore, to achieve such an effect, the core may extend in the axial direction by a dimension sufficient to reduce its stiffness, for example, by a dimension that is at least 200% of an axial thickness of the core. Thus the local change in the axial position of the core necessarily produces an effect on the vibratory responses of the sector. Furthermore, in all cases the core extends between the axial edges of the internal shell. In other words, the core does not protrude from the rest of the shell in the axial direction.

In the various embodiments of the guide vane assembly, depending on the geometry of the sectors, the core of the internal shell of a sector may form a right angle with the wafer of said sector (as for example in the embodiments of FIGS. 6a and 6b) or be inclined with respect to this wafer (as for example in the embodiments of FIGS. 5a and 5b). Put another way, the core segment of each sector, which comprises at least one concavity, comprises circumferential ends that extend in a plane perpendicular to the axis about which the guide vane assembly extends, or that extend in planes inclined with respect to that axis.

Advantageously, the manufacture of a guide vane assembly using the guide vane assembly sector geometries according to the invention can be obtained both by machining and by additive manufacturing.

Finally, in all the embodiments of the guide vane assembly, only the shape of the internal shell of the sectors of the guide vane assembly is changed. There is therefore no impact on the aerodynamic design or the integration of said guide vane assembly.

The invention claimed is:

1. A guide vane assembly for an aircraft turbine engine, this guide vane assembly comprising two annular shells, an internal and an external respectively, extending around a common axis and connected together by blades, said internal shell having, in axial cross-section, an I shape and comprising two cylindrical walls, respectively internal and external, and connected to each other by an annular core, the guide vane assembly being sectorized and comprising a plurality of sectors arranged circumferentially next to each other about said axis, wherein each of the sectors comprises a core segment which comprises at least one concavity, corresponding to a variation of an axial position of the core segment along a longitudinal extent of each of the sectors, oriented in the axial direction.

2. The guide vane assembly of claim 1, wherein each of the sectors comprises the core segment which comprises at least one concavity oriented towards upstream with respect to a flowing direction of gases through the guide vane assembly in operation.

3. The guide vane assembly of claim 1, wherein each of the sectors comprises the core segment which comprises at least one concavity oriented towards downstream with respect to a flowing direction of gases through the guide vane assembly in operation.

4. The guide vane assembly according to claim 1, wherein each of the sectors comprises the core segment which comprises at least two concavities axially oriented in a same direction.

5. The guide vane assembly according to claim 1, wherein the guide vane assembly sectors are identical.

6. The guide vane assembly according to claim 1, wherein said core segment extends in an axial direction over a dimension that is at least 200% of an axial thickness of the core.

7. The guide vane assembly according to claim 1, wherein the core segment has a sinusoidal shape about said axis.

8. The guide vane assembly according to claim 1, wherein the core segment of each of the sectors comprises circumferential ends which extend in a plane perpendicular to the axis, or which extend in planes inclined with respect to that axis.

9. The guide vane assembly according to claim 1, wherein said internal cylindrical wall carries an annular coating of abradable material.

10. The aircraft turbine engine, comprising the at least one guide vane assembly according to claim 1.

* * * * *